2 Sheets—Sheet 2.
F. G. SARGENT.
Wool-Washing Machine.
No. 209,138. Patented Oct. 22, 1878.
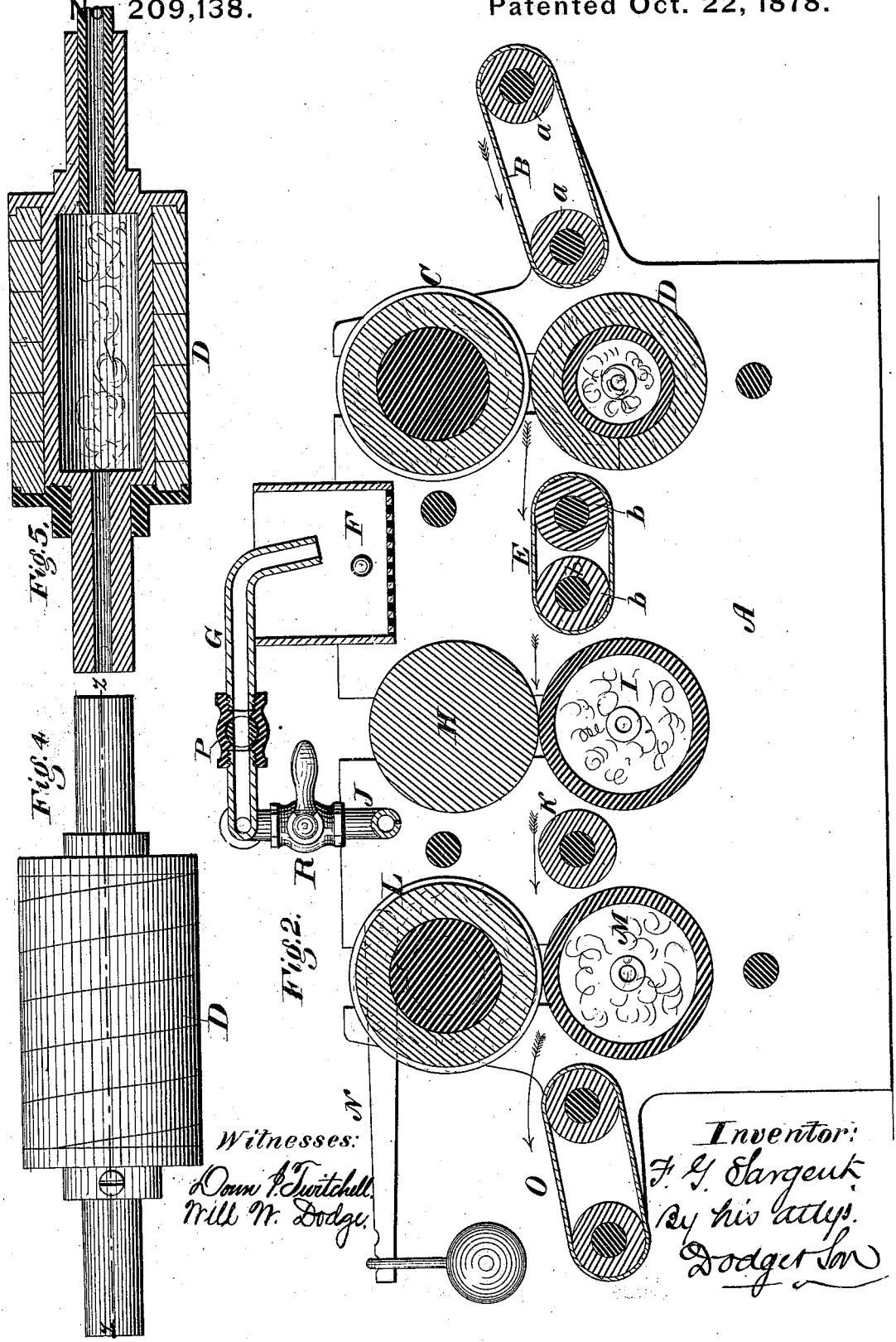

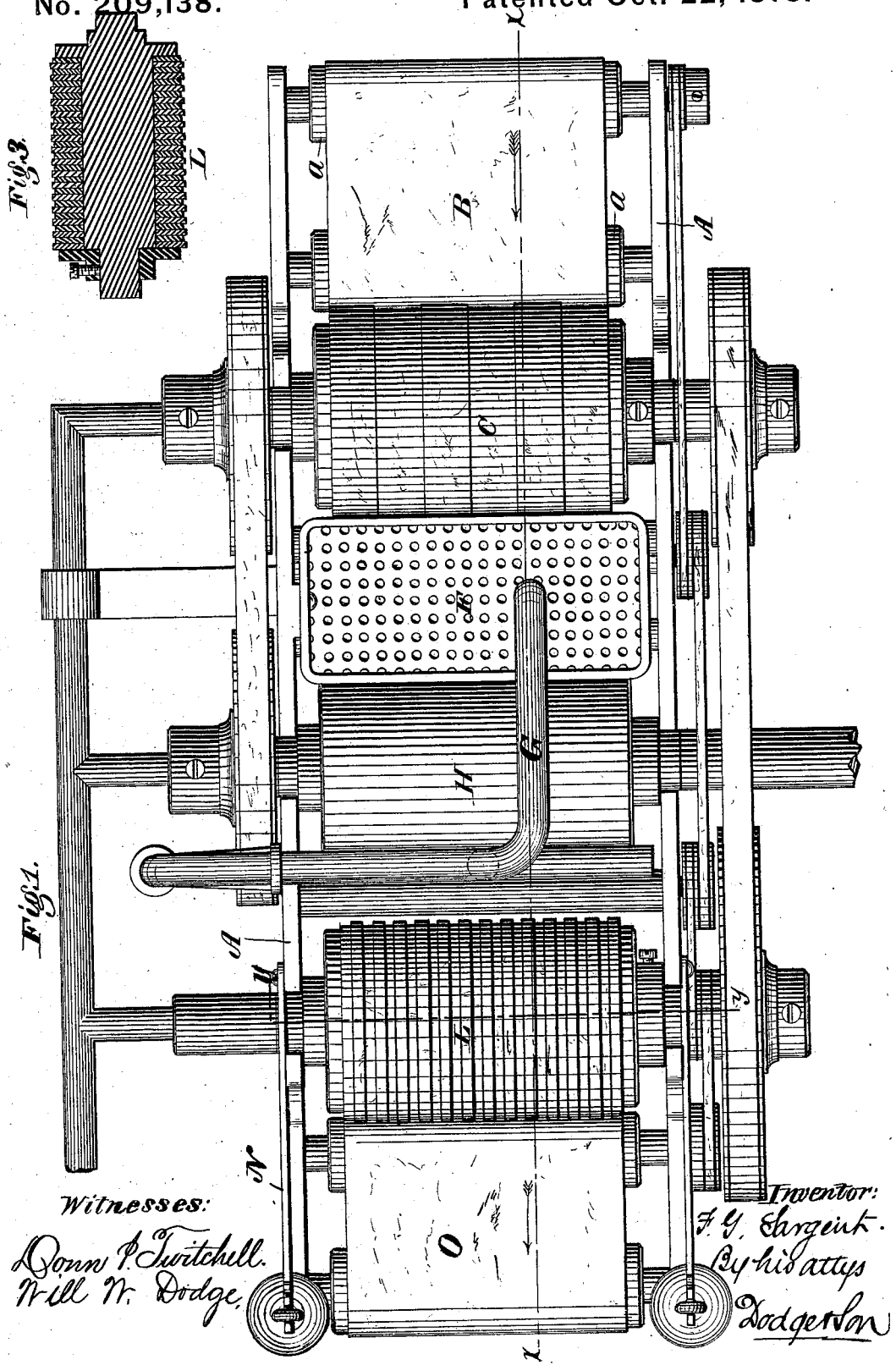

UNITED STATES PATENT OFFICE.

FREDERICK G. SARGENT, OF GRANITEVILLE, MASSACHUSETTS.

IMPROVEMENT IN WOOL-WASHING MACHINES.

Specification forming part of Letters Patent No. 209,138, dated October 22, 1878; application filed October 1, 1877.

*To all whom it may concern:*

Be it known that I, FREDERICK G. SARGENT, of Graniteville, in the county of Middlesex and State of Massachusetts, have invented certain Improvements in Wool Washing and Drying Machines, of which the following is a specification:

My invention relates to a machine or organization of mechanism adapted for carrying out at one continuous automatic operation the washing and subsequent drying, ready for use, of wool and similar fibrous material, whereby the ordinary laborious and expensive operation of transferring the fiber from a washing-machine to a drying apparatus is avoided.

The invention also relates to various details of construction of the washing and drying devices, as hereinafter described and explained.

Figure 1 represents a top view of an apparatus constructed on my plan; Fig. 2, a longitudinal vertical section of the same on the line $x\ x$; Fig. 3, a section lengthwise through one of the felt-covered rolls or cylinders on the line $y\ y$; Fig. 4, a side view of one of the hollow rolls or cylinders; Fig. 5, a longitudinal central section of the same on the line $z\ z$.

A represents the main frame of the apparatus, consisting, mainly, of two upright side walls, having bearings for the various transverse shafts and rolls.

B represents an endless feed-apron, mounted at the front of the machine on two transverse rolls, $a$, and having preferably a downward inclination toward the machine, as shown.

C and D represent two large transverse rolls or cylinders, arranged at the inner end of the feed-apron, with the former resting on the latter, with bearings in vertical slots, which admit of its rising and falling. The two rolls C and E are both covered with a heavy layer of felt, as shown, and the lower one made hollow to receive steam, which is admitted through its journal when the apparatus is in motion.

E represents a horizontal endless carrying-apron, mounted on two transverse rolls, $b$, just behind the cylinders C D, so as to receive upon its upper surface the fiber entering between them.

F represents a box with a perforated bottom arranged above the apron E, and G represents a pipe, through which water or other washing or dyeing fluid is delivered into the box during the action of the apparatus.

H and I represent a second pair of cylinders, arranged at the inner end of the carrier-apron, with the upper one resting on the lower, and arranged to rise and fall freely.

J represents a transverse perforated pipe, arranged in rear of the rolls H and I in position to discharge water, with which it is supplied during the operation of the machine, in jets or spray upon the passing fiber below.

K represents a transverse roll immediately behind the cylinders H and I, with its top level with the top of the latter, to assist in passing the fiber backward.

L and M represent a third pair of cylinders or rolls, arranged behind the roll K, the upper one being movable vertically and bearing on the lower one, as in the other cases.

By preference the cylinder H is made solid and the rolls I and M hollow, in order that they may be heated by steam, while the cylinder L is made solid and covered with felt, as shown.

The roll L is pressed downward by means of weighted levers N, pivoted to the frame, and bearing on the journals of the cylinder, as shown.

O represents an endless apron, mounted on two transverse rolls, and inclining downward from the rolls M N, as shown.

While it is preferred to leave the cylinders H and I plain and naked on the surface, they may be either or both covered with felt, as may also the roll M.

The felt may be applied to the cylinders, as shown in Fig. 3, in the form of rings slipped thereon side by side, and fastened by metal collars slipped upon the ends, and screwed or otherwise fastened in place, as shown.

In order to secure the best results, the felt covering should have a series of parallel circumferential grooves, which may be turned or otherwise formed therein after the roll is otherwise completed, but which are best formed by making the felt rings of two sizes and applying alternately those of large and small size, as shown.

Another method of applying the felt is to make the same in one or more narrow strips and wind it spirally upon the cylinder, as shown in Figs. 4 and 5, the ends being held by grooves in the inner faces of the end collars, or in any other suitable manner.

It is to be understood that in the combinations in which they are used the different forms of felt-covered roll are equivalents of each other to the extent that they are absorbent and adapted to apply pressure, but that the grooved roll is superior to those having smooth faces in being softer and more highly absorbent. The covering of a roll with a smooth surface of felt, as shown in Figs. 4 and 5, I do not claim, nor do I claim a roll the body of which is composed of felt and the periphery of which is smooth.

By means of suitable belts and pulleys, gearing, or other devices, the various rolls are so connected as to rotate in the directions indicated by the arrows. When the machine is in operation, steam is admitted constantly to the hollow rolls, and a full supply of water or other fluid maintained in the pipes G and J. The fiber, being spread upon the apron B and carried inward, passes between the rolls C D, and thence upon the apron E, where it is subjected to and washed by the shower of water falling from the box F. From the apron E the fiber passes between the rolls H and I, which remove the greater portion of the water, together with the dirt and solvent impurities. Issuing from the rolls H I, the fiber is again subjected to a shower of water from the pipe J, and then passed by the roll K between the rolls L and M, which, by their combined pressure, their yielding surfaces, and the heat due to the contained steam, effectually remove all moisture from the fiber, and deliver the same dry and in condition for immediate use.

It will be seen that by the foregoing operation the fiber is both cleansed and dried ready for use at one continuous automatic operation, and with but one handling.

Hitherto it has been customary to wash the fiber in one machine and then transfer it from the delivery-rolls of said machine by hand to a separate drying apparatus—an operation which was laborious, expensive, and slow. By my improvement the operation of transferring and rehandling is avoided, and the fiber transferred directly and in desirable shape to the drying mechanism.

Stop-cocks P and R may be used in the water-pipes, as shown, so as to shut off the water from either or both pipes at will.

The showering devices shown may be replaced by any other washing devices or mechanism known and used in the art. The washing devices may receive the fiber prior to its having received the usual primary washing, or afterward, as its condition and quality render advisable. In cases where the wool requires a very thorough washing, the apparatus shown may be built in connection with and as an integral part of any suitable washing-machine now in use, in which case the rolls C D will be at the rear of the washing devices, and will form at once the delivery-rolls of the washing mechanism and the feed-rolls of the drying apparatus. When the parts are thus arranged the water from the pipes G and J may be in some instances dispensed with.

I am aware that grooved or corrugated rolls have been used for many purposes, and that a spirally-ribbed rubber roll has been used in a clothes-washing machine to act upon the fabric; but such rolls could not be used as a substitute for my absorbent felt rolls; and I am not aware that a grooved or corrugated felt roll was ever made prior to the date of my invention. The felt roll differs from the others in that its raised portions exert a pressure, while the depressed portions, free from pressure, readily absorb the moisture.

Having thus described my invention, what I claim is—

1. The roll having a grooved or corrugated felt surface, substantially as and for the purposes described.

2. The absorbent pressure-roll, composed of large and small rings or washers of felt, arranged substantially as and for the purpose described.

3. The combination of the delivery-rolls C D of a wool-washing machine and the system of squeezing and heating rolls, arranged substantially as shown, and adapted to receive and automatically act upon the fiber as it leaves the washing-machine.

4. In a wool-drying machine, a felt-covered cylinder made hollow and adapted to be heated by steam.

5. A wool-drying machine having its parts constructed and arranged to subject the fiber to the combined action of pressure, the felt absorbent surfaces, and heat, in the manner shown and described.

FREDERICK GRANDISON SARGENT.

Witnesses:
GEO. A. GRIFFIN,
HENRY J. O'BRIEN.